(No Model.)
E. SHOBE & J. F. PLATT.
STRAINER PAIL.
No. 428,699. Patented May 27, 1890.
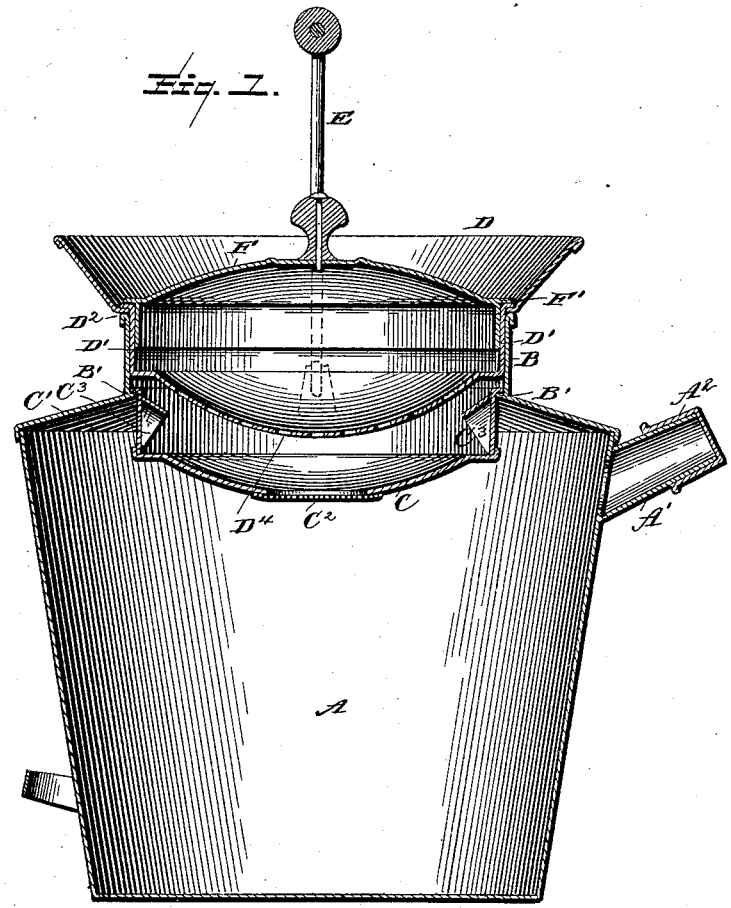
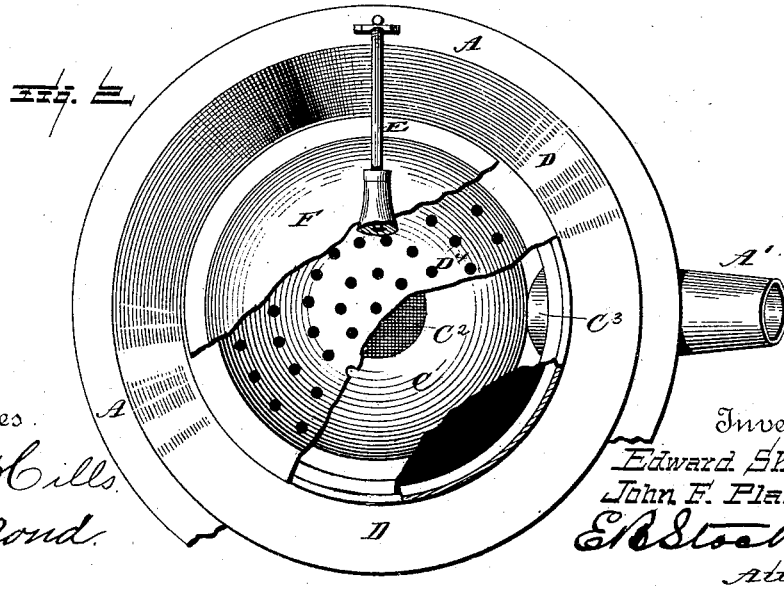

UNITED STATES PATENT OFFICE.

EDWARD SHOBE, OF LOUISVILLE, KENTUCKY, AND JOHN F. PLATT, OF NEW ALBANY, INDIANA.

STRAINER-PAIL.

SPECIFICATION forming part of Letters Patent No. 428,699, dated May 27, 1890.

Application filed December 3, 1889. Serial No. 332,393. (No model.)

*To all whom it may concern:*

Be it known that we, EDWARD SHOBE, of Louisville, in the county of Jefferson, State of Kentucky, and JOHN F. PLATT, of New Albany, in the county of Floyd, State of Indiana, citizens of the United States, have invented certain new and useful Improvements in Straining-Pails, of which the following is a specification, reference being had therein to the accompanying drawings.

This invention relates to certain new and useful improvements in strainer-pails designed for use in milking, to prevent dirt and foreign substances from entering the milk, and it aims to provide an improved pail of this class.

The novelty in the present instance resides in the peculiarities of construction and the combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a vertical central section through a pail embodying our improvement. Fig. 2 is a top plan of the same with parts broken away.

Like letters of reference indicate like parts in both views.

Referring now to the details of the drawings by letter, A designates the body of the pail or bucket provided with discharge-spout A', covered by a suitable removable cap A².

B is the neck, formed with an interior annular flange or projection B' to receive and support the inner or lower strainer C, which is made removable, and is provided with an outwardly-extending annular flange C' at its top, which engages and rests upon the flange B', as shown in Fig. 1. The perforations in this strainer are of fine mesh, as indicated at C², and the strainer is provided upon its interior with handles C³, the upper faces of which are inclined from the outer walls of the strainer inwardly, so as to shed any milk that might fall thereon toward the center of the strainer. This strainer is designed to fit snugly within the neck of the bucket, so as not to be displaced in case the bucket should be upset, and being perforated at the center only forms a pan to hold the milk while being strained. By removing the strainer it may be used for straining a variety of liquids.

D is a flaring top terminating in a straight portion D', adapted to fit snugly within the upper portion of the neck B of the bucket, being provided with an annular shoulder or rim D² at the junction of the flaring and straight portion and designed to rest upon the top of the neck, as indicated in Fig. 1. D⁴ is a strainer upon the lower end of said straight portion and having perforations considerably larger than those in the lower strainer. By making the perforations in the upper strainer of larger mesh the milk passes through more readily, the perforations will not clog up, and the milk is prevented from splashing while milking. Should any dirt, hair, or other foreign substance pass through the upper strainer, it will be caught by the lower strainer and prevented from passing into the interior of the bucket.

The bucket is provided with a suitable bail and handle E of any well-known construction.

F is a cover provided with a suitable knob or handle, and is designed to fit over the top of the upper strainer within the flaring portion thereof, as shown, to keep the bucket clean when not in use, the said cover having a flange F', designed to rest upon the top of the flange D² of the flaring top, as illustrated.

What we claim as new is—

1. The combination, with the bucket provided with a neck formed with an interior flange, of the lower strainer having an annular flange resting upon said flange, and a neck formed with interior handles, and an upper strainer having its perforations above said handles, substantially as described.

2. The combination, with the bucket provided with a neck formed with an interior flange, of the upper strainer, and the lower strainer having an annular flange resting upon said flange, and a neck formed with interior handles, the upper faces of which are inclined inward below the perforations of the upper strainer, substantially as described.

3. The combination, with the bucket having neck and interior flange and the lower strainer having exterior flange resting on said flange, of the upper strainer having perforations of larger mesh than those of the lower strainer, and formed with flaring top and straight neck fitting within the neck of the bucket, and with annular flange resting upon the top of the neck of the bucket, substantially as and for the purpose specified.

4. The combination, with the bucket having a neck provided with an interior flange, of a lower strainer having an annular rim resting upon said flange, the top having flaring portion, and straight neck fitting within the neck of the bucket and carrying a strainer of larger mesh than that of the lower strainer, and formed with an annular flange resting upon the top of the neck of the bucket, and a cover fitting within the flaring portion of the top and having a depending ring fitted within the neck of the top, and an exterior flange resting upon the flange of said cover, substantially as shown and described.

In testimony whereof we affix our signatures in presence of two witnesses.

EDWARD SHOBE.
JOHN F. PLATT.

Witnesses:
C. H. IRWIN,
JOHN GORDON.